United States Patent
Taoka et al.

(10) Patent No.: US 7,006,012 B2
(45) Date of Patent: Feb. 28, 2006

(54) AUTOMATIC TRAIN STOP SYSTEM

(75) Inventors: Hiroshi Taoka, Hitachinaka (JP); Dai Watanabe, Hitachi (JP); Noriharu Amiya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/664,905

(22) Filed: Sep. 22, 2003

(65) Prior Publication Data

US 2005/0001741 A1    Jan. 6, 2005

(30) Foreign Application Priority Data

Jul. 3, 2003    (JP)    ............................. 2003-191313

(51) Int. Cl.
G08G 1/01    (2006.01)

(52) U.S. Cl. .................. 340/933; 246/122 R; 701/20
(58) Field of Classification Search ................ 340/933; 246/7, 8, 9, 14, 20, 122 R; 701/19, 20
See application file for complete search history.

(56) References Cited

U.S. PATENT DOCUMENTS

| 3,666,217 A | * | 5/1972 | Sibley ..................... 246/34 CT |
| 3,743,935 A | * | 7/1973 | Alt .............................. 455/523 |
| 3,840,737 A | * | 10/1974 | Hoyler ..................... 246/63 R |
| 4,074,879 A | * | 2/1978 | Clark et al. ................... 246/37 |
| 4,641,803 A | * | 2/1987 | Brown et al. ............ 246/34 CT |
| 4,723,739 A | * | 2/1988 | Franke ..................... 246/34 C |
| 5,437,422 A | * | 8/1995 | Newman ........................ 246/5 |

* cited by examiner

Primary Examiner—Brent A. Swarthout
(74) Attorney, Agent, or Firm—Antonelli, Terry, Stout and Kraus, LLP.

(57) ABSTRACT

In an automatic train stop system in which a track circuit 3 is divided into track circuit sections 1T, 2T and 3T, and a digitized train control information telegram (ATS telegram) 8 is transmitted through the track circuit sections on carriers having different frequencies, a carrier sensor 12 mounted on a train 5 receives a carrier in the track circuit 3 and detects a track circuit boundary 31 by detecting a level change of the carrier, whereby an onboard system grasps the position thereof and controls the train 5 based on the information of the ATS telegram 8.

10 Claims, 6 Drawing Sheets

FIG. 3

ATS TELEGRAM INFORMATION

| INFORMATION A | INFORMATION B | INFORMATION C | INFORMATION D | INFORMATION E | INFORMATION F | INFORMATION G | INFORMATION H | INFORMATION I |
|---|---|---|---|---|---|---|---|---|

INFORMATION A: START FLAG
INFORMATION B: SERIAL NUMBER
INFORMATION C: PATTERN END TYPE
INFORMATION D: BLOCK INNER LENGTH
INFORMATION E: BLOCK END ASPECT SPEED
INFORMATION F: AVERAGE GRADIENT
INFORMATION G: TRACK CIRCUIT TYPE
INFORMATION H: CRC
INFORMATION I: END FLAG

TD TELEGRAM

INFORMATION A : START FLAG

INFORMATION B : SERIAL NUMBER

FIG.5
(A)
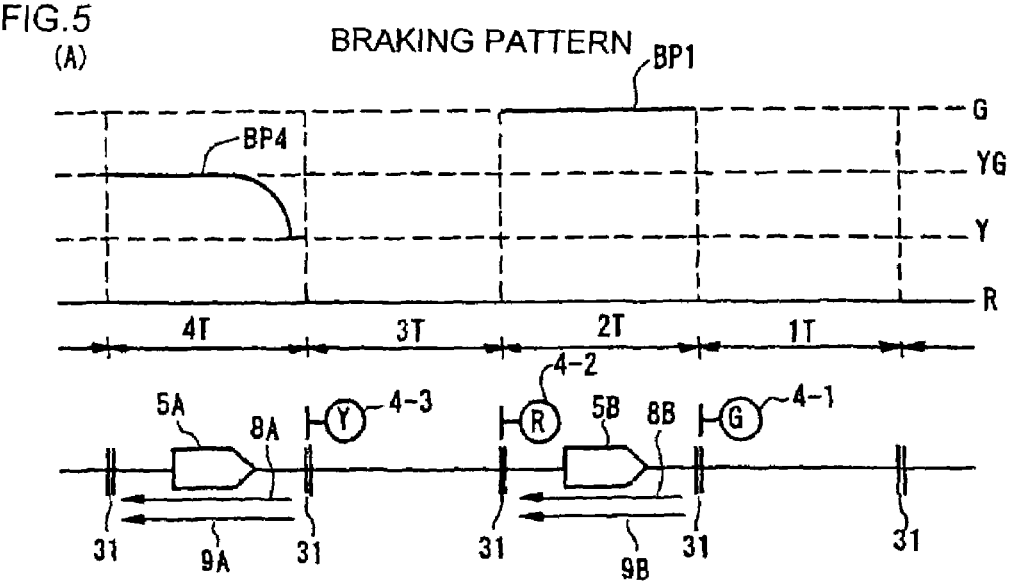
(B)
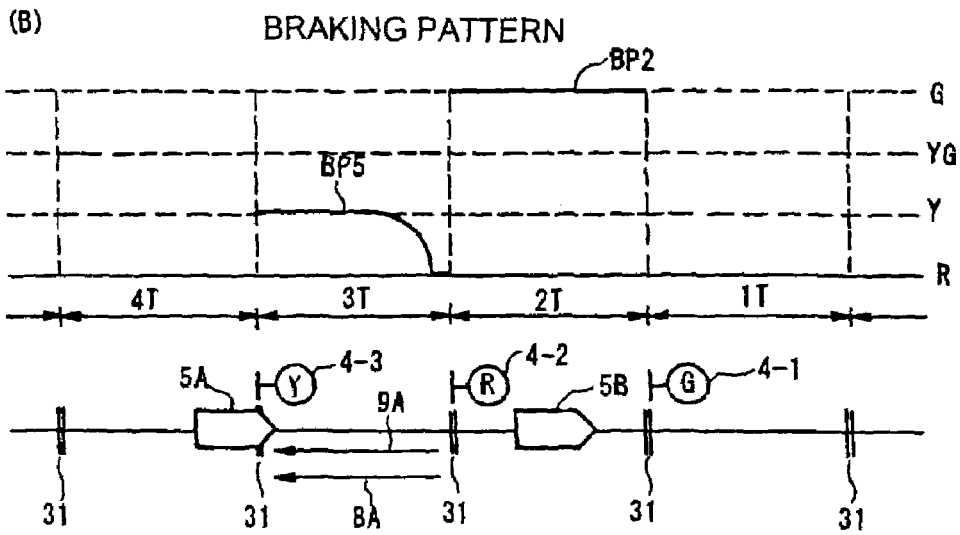
(C)
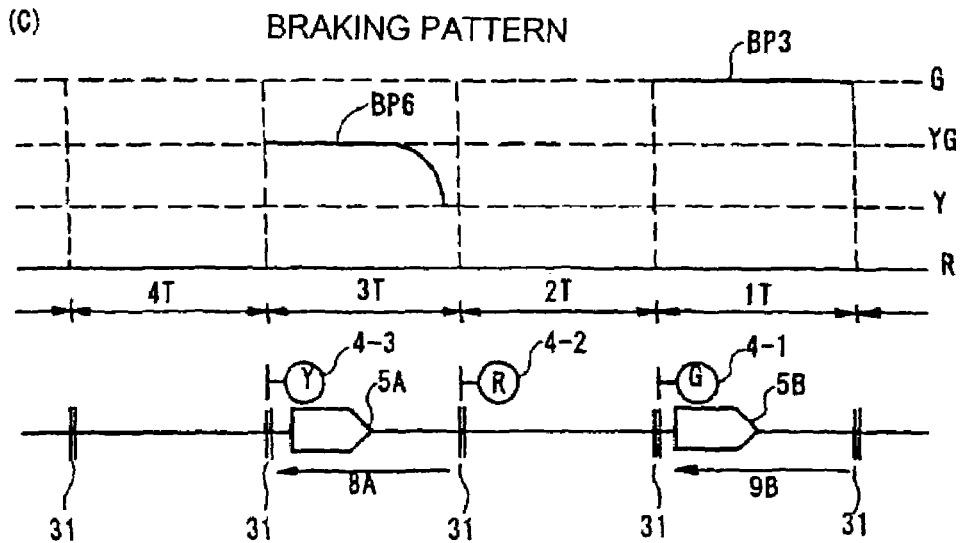

FIG.6
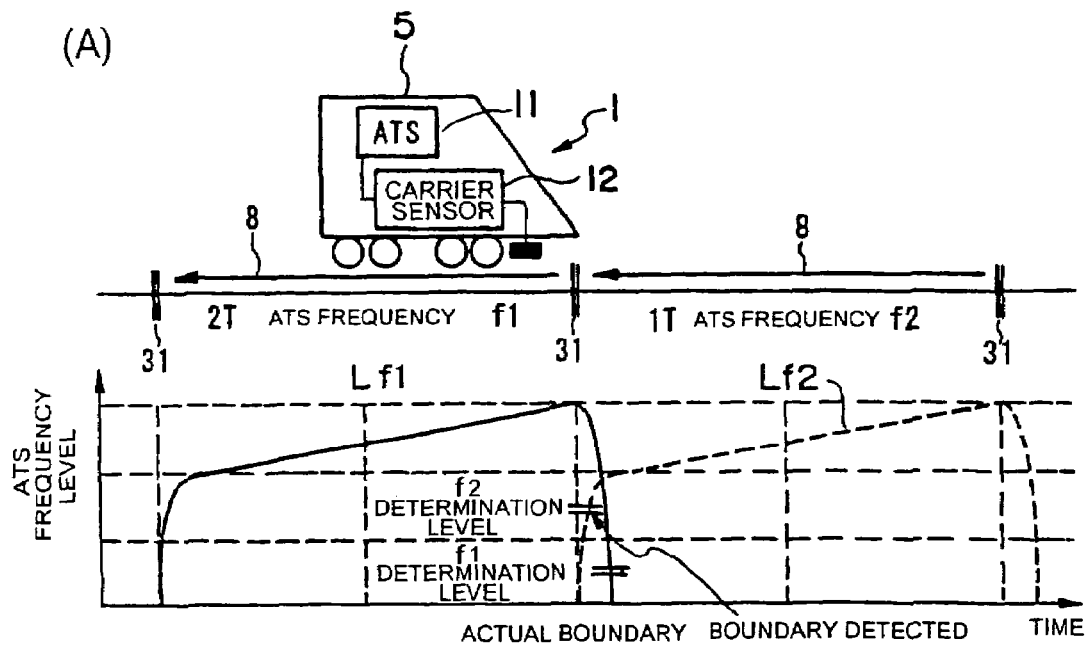
(A)
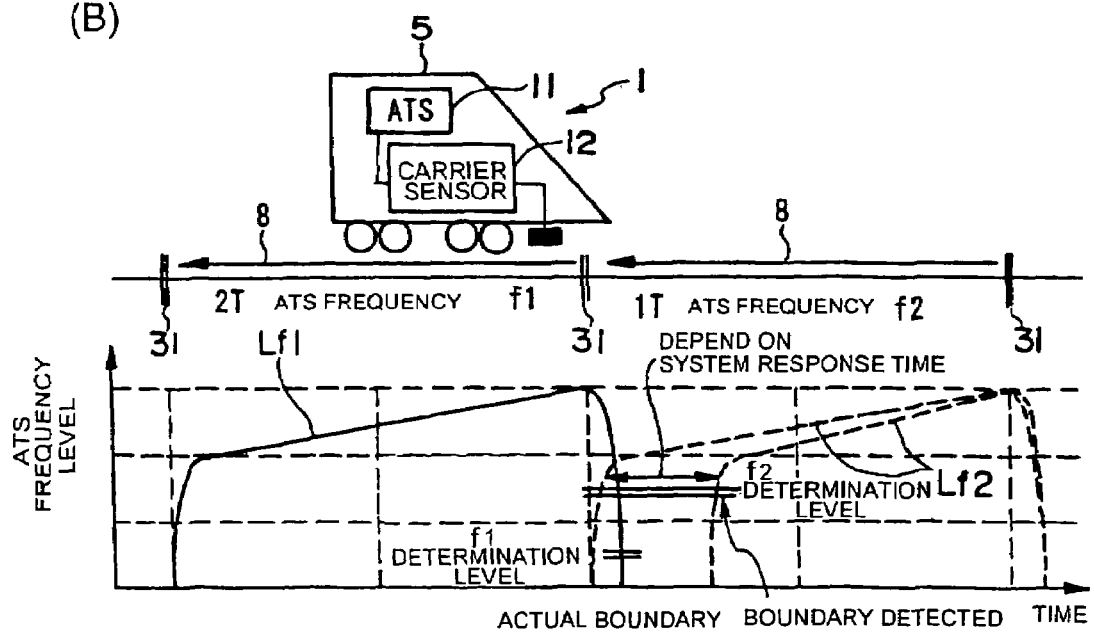
(B)

AUTOMATIC TRAIN STOP SYSTEM

FIELD OF THE INVENTION

The present invention relates to an automatic train stop system comprising a plurality of separate track circuits and an onboard device, the track circuits carrying a digitized train control information telegram.

DESCRIPTION OF THE RELATED ART

The JR (Japan Railways) companies introduced a frequency-variable ATS-S system (ATS: automatic train stop) in the times when they were the Japanese National Railways. As shown in FIG. 2, this system is designed in the following manner. That is, when an onboard unit 72 of an ATS onboard device 7 mounted on a train 5 receives a frequency-variable signal at a frequency of 130 kHz from a ground unit 6 installed in a track circuit 3 at a point at a predetermined distance from a signal device 4 (normally installed about 800 m before the signal device and referred to as a long ground unit), an ATS onboard logic portion 71 varies a constant oscillation frequency of 105 kHz, causing an onboard alarm (not shown) to ring to alert the motorman that the approaching signal device 4 provides a stop aspect.

Normally, in response to this alarm, the motorman performs acknowledgment by pressing an acknowledge button and performs appropriate braking to stop the train safely. However, if the motorman is unaware of the alarm and performs no acknowledgement within 5 seconds after the alarm, the ATS-S onboard device outputs an emergency brake instruction to cause the train to stop before the signal device 4.

Since the ATS-S system was introduced, the number of train accidents due to red signal violation has been reduced significantly. However, there still remain some problems. To address these problems, the JR companies derived from the JNR have respectively improved the ATS-S system by providing a function of stopping the train without condition rather than providing an alarm when the stop aspect is received, a function of identifying a train with high braking performance to change the way of providing the alarm based on the identification, or the like. However, although such an improved system has an immediate emergency stop function which requires no acknowledgment by the motorman, the function is intended for an absolute signal device only and not for an inter-station signal device. Therefore, there still remains the conventional problem that red signal violation is not eliminated which occurs when the motorman forgets performing braking after performing acknowledgment.

Furthermore, trains have different deceleration and stopping performances, and thus, the position where the ground unit is installed has to be determined so as to accommodate the train with the lowest stopping performance. Thus, even if a train with a high deceleration and stopping performance is introduced, heavy traffic operation cannot be attained, and therefore, the problem has not been essentially solved.

In conventional ATS systems, an onboard device performs train control based on a frequency variable signal from a ground unit. Therefore, an immediate emergency stop function which requires no acknowledgment by the motorman is provided for an absolute signal device only, and as for inter-station signal devices, acknowledgment by the motorman is still required. Furthermore, since the protective function of the ATS is disabled once the acknowledgment is performed, there is a problem that accidents caused by red signal violation due to the motorman forgetting performing braking cannot be eliminated entirely.

In addition, in an ATS-S system, the installation position of a ground unit which is referred to when an alarm indicating the presence of a signal device or the need for deceleration is raised is determined so as to accommodate a train having the lowest braking performance of the trains in service in the track section. Therefore, there is a problem that, in the case where trains having different deceleration performances are in service in a same track section, the trains cannot be controlled independently in accordance with their performances.

Furthermore, in the case of point control information transmission in which control information is received from the ground unit, once information is received, the information cannot be updated before the next information point (ground unit) is reached. That is, there is a problem that, when a signal device ahead of a train provides a stop aspect and the train receives the information from a ground unit, even if the signal device changes the aspect, the information cannot be updated until the train receives new information from the next ground unit.

SUMMARY OF THE INVENTION

The invention aims to solve the problems described above. That is, an object of the invention is to provide an automatic train stop system that can eliminate accidents caused by red signal violation due to a motorman forgetting to stop after the acknowledgment for a signal device excluding an absolute signal device.

Another object of the invention is to provide an automatic train stop system that controls trains independently in accordance with performances thereof in the case where trains with different deceleration performances are in service in a same track section.

Further object of the invention is to provide an automatic train stop system in which, after stop aspect information is received from a signal device ahead of the train, the aspect information can be updated when the signal device changes the aspect.

The problems described above are solved by an automatic train stop system in which a track circuit is divided into a plurality of track circuit sections, a digitized train control information telegram is transmitted through the track circuit on carriers having different frequencies for adjacent track circuit sections, and an onboard system grasps the position thereof based on a change of the frequency of a carrier in the tack circuit, generates a one-step braking pattern based on the train control information in the digital telegram and constantly checks the speed.

Specifically, a first means for solving the problems described above according to the invention is an automatic train stop system, in which a track circuit is divided into a plurality of track circuit sections, and a digitized train control information telegram is transmitted through the track circuit on carriers having different frequencies for adjacent track circuit sections, characterized in that a carrier sensor mounted on a train receives a frequency of a carrier in the track circuit and detects a track circuit boundary by detecting a change of the frequency of the carrier, whereby an onboard system grasps the position thereof.

A second means for solving the problems described above according to the invention is the first means described above, characterized in that the onboard system having received the digitized train control information telegram performs, after the telegram information is validated, correction of a position with respect to the track circuit boundary using a train speed and a system response time.

A third means for solving the problems described above according to the invention is the first or second means described above, characterized in that the onboard system having received the digitized train control information telegram generates a one-step braking pattern for a block end aspect speed based on a pattern end type, a block inner length, a block end aspect speed, an average gradient or the like in the telegram information, and constantly checks the speed on the train.

A fourth means for solving the problems described above according to the invention is any of the first to third means described above, characterized in that in the case of an insulating track circuit section, the digitized train control information telegram is transmitted to the track circuit section when the head of the train lies within the track circuit section, when a route is set, or constantly, and in the case of a non-insulating track circuit section, the digitized train control information telegram is transmitted to the track circuit section when the head of the train lies within the track circuit section.

A fifth means for solving the problems described above according to the invention is any of the first to fourth means described above, characterized in that a digitized train detection telegram is transmitted to the track circuit constantly.

BRIEF DESCRIPTION OF THE DRAWINGS

FIG. 3 specifically shows information contained in an ATS telegram created by an ATS ground logic portion of the automatic train stop system to which the invention is applied;

FIG. 5 shows an operation of the automatic train stop system to which the invention is applied when a signal aspect change occurs; and FIG. 6 illustrates detection of a change in a carrier frequency of the automatic train stop system to which the invention is applied, in which FIG. 6(A) shows a case where a track circuit boundary is insulated, and FIG. 6(B) shows a case where the track circuit boundary is non-insulated.

DETAILED DESCRIPTION OF THE PREFERRED EMBODIMENT

Figure 1:
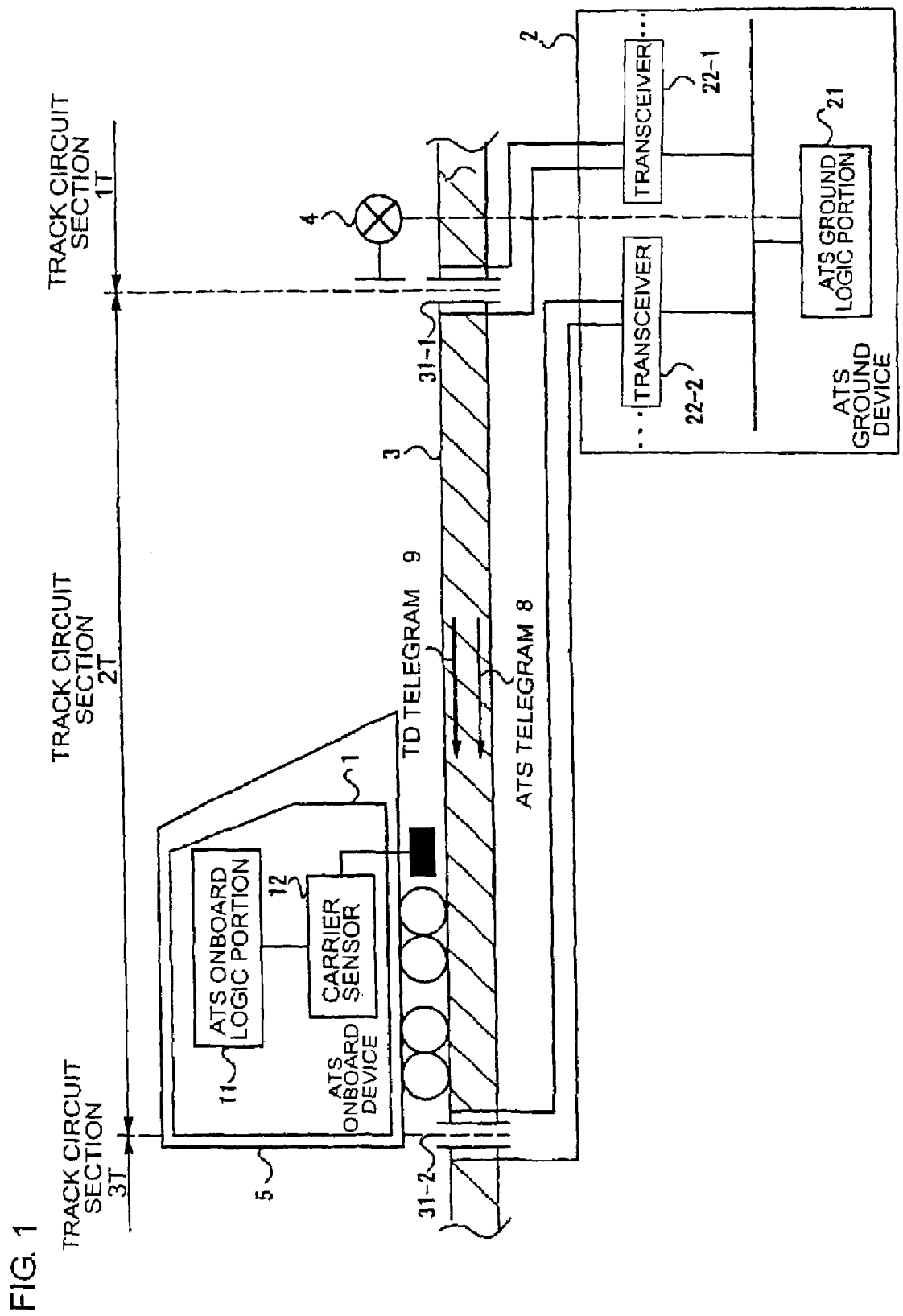
FIG. 1 shows a configuration of an automatic train stop system to which the invention is applied.
Figure 2:
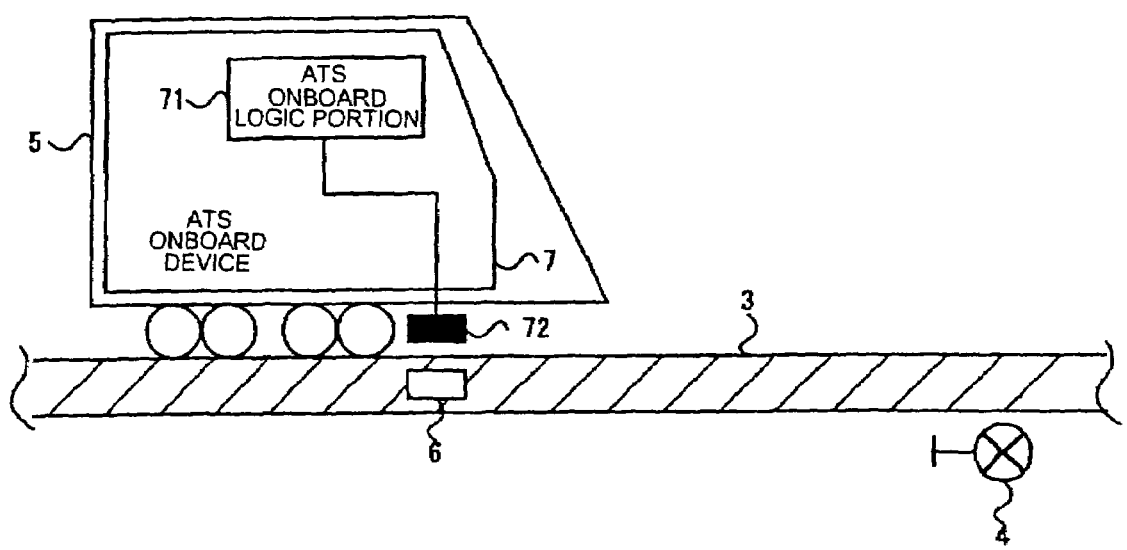
FIG. 2 shows a configuration of a conventional ATS-S system.

An embodiment of an automatic train stop system according to the present invention will be described with reference to FIG. 1. In FIG. 1, the automatic train stop system comprises an ATS onboard device 1 mounted on the train 5, an ATS ground device 2, a track circuit 3, and a signal device 4. The track circuit 3 is divided into a plurality of track circuit sections 1T, 2T, 3T . . . by track circuit boundaries 31. Through each of the track circuit sections 1T, 2T, 3T . . . , an ATS telegram (train control information telegram) 8 and a TD telegram (train detection telegram) 9 are transmitted which are carried by carriers having different frequencies for adjacent track circuit sections.

The ATS onboard device 1 has an ATS onboard logic portion 11 and a carrier sensor 12. The ATS ground device 2 has an ATS ground logic portion 21 and a plurality of transceivers 22.

The ATS ground logic portion 21 of the ATS ground device 2 has a function of acquiring input information from another device, a train detecting function, a route condition setting function, a track circuit following function, an ATS telegram creating function, and an ATS telegram transmitting function.

The function of acquiring input information from another device is a function to acquire aspect information about a signal device required for creating an ATS telegram.

The train detecting function is to transmit a TD telegram to all the track circuit sections within a control range via the transceivers and to determine whether the track circuit sections are occupied or not occupied based on whether the carrier levels are above or below a determination level at the time when the track circuit sections receive the TD telegram.

The route condition setting function is to set a route condition for each of the track circuit sections based on aspect information obtained from the input information.

The track circuit following function is to determine, with respect to the track circuit sections determined to be occupied or not occupied in the train detection, whether the occupied state or the non-occupied state is a valid one caused by the presence of a train based on continuity thereof, and if a track circuit section is determined to be in a valid occupied state, to recognize that a train is on the track circuit section. Furthermore, after it is recognized that there is a train on the track circuit section, the direction of travel of the train is determined based on the continuity of the occupied or not-occupied state, and the head of the train is recognized.

The ATS telegram creating function is to create an ATS telegram for each of the track circuit sections when the following conditions are met. If the track circuit section for which an ATS telegram is to be created is an insulating track circuit section, the ATS telegram is created constantly or when there is a route setting and the head of a train is recognized. Alternatively, if the track circuit section for which an ATS telegram is to be created is a non-insulating track circuit section, the ATS telegram is created when the head of a train is recognized.

The ATS telegram transmitting function is to transmit an ATS telegram to a transceiver associated with a track circuit section for which the ATS telegram is to be transmitted.

The transceiver 22 receives a TD telegram or ATS telegram from the ATS ground logic portion 21, MSK-modulates the digital telegram and transmits the modulated digital telegram to a track circuit section. Furthermore, it transmits to the ATS ground logic portion 21 a level of a carrier of a TD telegram and a TD telegram received from the track circuit 3.

The ATS onboard logic portion 11 of the ATS onboard device 1 has a position detection function, a position correction function and a pattern generation function.

The position detection function is to recognize a track circuit boundary when a change is detected in the frequency of the carrier of the ATS telegram 8 received from the carrier sensor 12.

In the case where the track circuit boundary between the track circuit section which the train has entered and the outer track circuit section with respect to the direction of travel of the train is insulated, the track circuit type in the ATS telegram is described as an insulating track circuit, and if the ATS telegram being received immediately after the track circuit boundary is recognized and which is recognized to be valid by the ATS onboard logic portion indicates that the track circuit boundary is insulated, then the position correction function corrects the travel distance of the train from the track circuit boundary 31 based on the train speed at the time when the train enters the boundary and the time from the detection of a change in the carrier frequency to the time when the ATS onboard logic portion recognizes that it has received a valid ATS telegram.

In the case where the track circuit boundary between the track circuit section which the train has entered and the outer track circuit section with respect to the direction of travel of the train is non-insulating, the track circuit type in the ATS telegram is described as a non-insulating track circuit, and if the ATS telegram being received immediately after the track circuit boundary is recognized and which is recognized to be valid by the ATS onboard logic portion indicates that the track circuit boundary is insulated, since the boundary detection is highly obscure, the position detecting function conducts no correction if the track circuit boundary recognized based on a carrier frequency change precedes the track circuit boundary recognized by a speed generator in the direction of travel of the train. That is, the ATS onboard logic portion regards the track circuit boundary and travel distance recognized by the speed generator as the correct track circuit boundary and travel distance, respectively.

The pattern generation function is to generate a one-step braking pattern for a block end aspect speed based on the deceleration performance of the train and various information in the ATS telegram including a block inner length, a block end aspect speed, an average gradient and a pattern end type. The generated pattern is compared against the current speed, and if necessary, optimal braking is conducted.

The carrier sensor 12 receives an ATS telegram transmitted on a carrier through the track circuit and transmits the frequency level (ATS frequency) of the carrier or a demodulated ATS telegram to the ATS onboard logic portion.

Detection of a change in the ATS carrier frequency will be described with reference to FIG. 6. FIG. 6(A) shows a relation between a level Lf1 of an ATS carrier frequency (ATS frequency) f1 of a track circuit section 2T and a level Lf2 of an ATS carrier frequency (ATS frequency) f2 of a track circuit section 1T when the train 5 enters from the track circuit section 2T to the track circuit section 1T in the case where the boundary 31 between the track circuit section 2T and the track circuit section 1T is insulated. If the track circuit boundary 31 is an insulating one, the ATS telegram 8 constantly flows through the track circuit.

When the train 5 passes through the actual track circuit boundary 31, the detection level Lf1 of the ATS frequency f1 of the track circuit section 2T is reduced. At the same time, the detection level Lf2 of the ATS frequency f2 of the track circuit 1T begins to increase.

Thus, a determination level for the detection level Lf2 of the ATS frequency f2 (f2 determination level) is set in the ATS onboard logic portion 11 of the ATS onboard device 1. Then, when the detection level Lf2 of the ATS frequency f2 becomes equal to or higher than the determination level, the ATS onboard device 1 determines that the ATS frequency is changed from the ATS frequency f1 of the track circuit section 2T to the ATS frequency f2 of the track circuit section 1T. In addition, the carrier detection determination level may be set for the ATS frequency f1 of the track circuit 2T, so that it maybe determined that the carrier frequency is changed from the frequency f1 to the frequency f2 when the detection level Lf1 of the ATS frequency f1 of the track circuit section 2T becomes equal to or lower than the f1 determination level and the detection level Lf2 of the ATS frequency f2 of the track circuit section 1T becomes equal to or higher than the f2 determination level.

In these cases, there is a slight error between the actual track circuit boundary 31 and the boundary detected by the ATS onboard device 1. Correction of the track circuit boundary detection error is conducted by determining the error based on the speed of the train entering the track circuit boundary 31 or by determining the error with an adequate margin considering safety. This correction is conducted when it is determined later that the ATS telegram is normally received.

FIG. 6(B) shows a relation between the level Lf1 of the ATS frequency f1 of the track circuit section 2T and the level Lf2 of the ATS frequency f2 of the track circuit section 1T when the train 5 enters from the track circuit section 2T to the track circuit section 1T in the case where the boundary between the track circuit section 2T and the track circuit section 1T is non-insulated.

In the case where the track circuit boundary 31 is a non-insulating one, the ATS ground device detects an occupied state when the level of the TD telegram 9 is reduced to be equal to or lower than the determination level, the track circuit following function recognizes the head of a train, and then the ATS telegram 8 is transmitted to the track circuit. It is when the ATS frequency transmitted to the track is received by the carrier sensor 11 that the ATS onboard device 1 can detect the ATS frequency f2 of the track circuit section 1T. Thus, the rising of the detection level Lf2 of the ATS frequency f2 of the track circuit section 1T largely depends on the system response time including the system cycle and the selection of the determination level.

Therefore, as in the case of the insulating track circuit, according to a boundary detection method for the non-insulating track circuit, the determination level for the detection level Lf2 of the ATS frequency f2 (f2 determination level) is set, and the ATS onboard device 1 determines that the ATS frequency is changed from the ATS frequency f1 to the ATS frequency f2 when the detection level Lf2 of the ATS frequency f2 becomes equal to or higher than the f2 determination level. In addition, the determination level may be set for the ATS frequency f1, so that it may be determined that the ATS frequency is changed from the frequency f1 to the frequency f2 when the detection level Lf1 of the ATS frequency f1 becomes equal to or lower than the f1 determination level and the detection level Lf2 of the ATS carrier frequency f2 becomes equal to or higher than the f2 determination level.

However, there is a significant error between the actual track circuit boundary 31 and the boundary detected by the ATS onboard device. Thus, if the boundary recognized by a speed generator precedes the boundary recognized depending on the level change of the carrier frequency in the direction of travel of the train, no distance correction is conducted.

Contents of the ATS telegram 8 will be described with reference to FIG. 3. In the ATS telegram, there are described a start flag (information A), a serial number (information B), a pattern end type (information C), a block inner length (information D), a block end aspect speed (information E), an average gradient (information F), a track circuit type (information G), a CRC (information H), and an end flag (information I).

The serial number is information updated for every system cycle when the ATS ground logic portion creates an ATS telegram and is intended for the ATS onboard logic portion to check the soundness of the ATS telegram.

The pattern end type is information that designates an end position of the one-step braking pattern generated by the ATS onboard logic portion.

The block inner length is information that designates a length of a block section from one signal device to another signal device.

The block end aspect speed is information that designates a speed associated with an aspect of a signal device.

The average gradient is information that designates an average gradient in a block. It can be designated in units of %.

The track circuit type is information that specifies whether the track circuit boundary between the track circuit section and the outer track circuit section is insulated or non-insulated.

Figure 4:
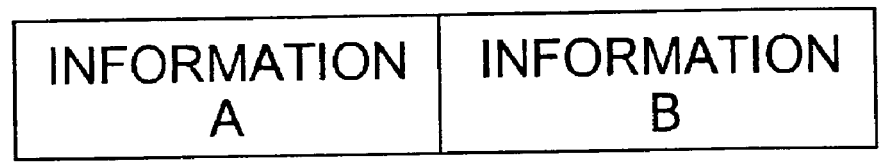
FIG. 4 specifically shows information contained in a TD telegram created by the ATS ground logic portion of the automatic train stop system to which the invention is applied.

Contents of the TD telegram 9 will be described with reference to FIG. 4. In the TD telegram, there are described a start flag (information A) and a serial number (information B).

The serial number is an information updated at every system cycle when the ATS ground logic portion creates a TD telegram and is intended for the ATS onboard logic portion to check the soundness of the TD telegram.

In the following, with reference to FIG. 5 which shows the relation between the entrance of a train into a track circuit section and the braking pattern, an operation of the ATS system at the time when a signal aspect change occurs will be described. FIG. 5(A) shows an initial state, in which the ATS ground logic portion detects reception level reductions of TD telegrams 9A and 9B in each of track circuit sections 1T to 4T, and thus, recognizes that trains 5A and 5B travel rightward and the heads of the trains 5A and 5B lie within the track circuit sections 4T and 2T, respectively. Furthermore, all the track circuit boundaries 31 are insulated. In this state, a signal device 4-1 on the track circuit section 1T provides a G aspect, a signal device 4-2 on the track circuit section 2T provides an R aspect and a signal device 4-3 on the track circuit section 3T provides a Y aspect.

In this state, an ATS telegram 8A is transmitted to the track circuit section 4T, an ATS telegram 8B is transmitted to the track circuit section 2T, the train 5A is operated in a braking pattern BP4 and the train 5B is operated in a braking pattern BP1.

From this state, a state shown in FIG. 5(B) is entered. When the train 5A enters the track circuit section 3T, the ATS ground logic portion detects that the reception level of the TD telegram 9A of the track circuit section 3T is reduced to be lower than a reference value, determines that it is a valid occupied state by means of the train following function, and recognizes that the train 5A travels rightward and the head thereof lies within the track circuit section 3T. Then, the ATS telegram 8A is created based on the aspect information (R) of the signal device 4-2 on the track circuit section 2T or the like.

The ATS ground logic portion transmits the ATS telegram 8A to a transceiver associated with the track circuit section 3T within which the head of the train 5A lies, and the transceiver MSK-modulates the ATS telegram 8A received from the ATS ground logic portion and transmits the MSK-modulated ATS telegram to the track circuit section 3T.

The carrier sensor of the ATS onboard device of the train 5A receives the carrier of the ATS telegram 8A flowing through the track circuit section 3T and transmits the same to the ATS onboard logic portion. The ATS on board logic portion recognizes the track circuit boundary 31 from the fact that the frequency of the received carrier has changed.

Then, the carrier sensor receives the ATS telegram 8A, demodulates the same and transmits the demodulated ATS telegram to the ATS onboard logic portion. The ATS onboard logic portion checks the validity of the received ATS telegram 8A based on the serial number and CRC information. If the ATS telegram is determined to be valid, the travel distance is calculated using the speed of the train at the time when the train enters the track circuit section 3T and the time required for the process in which the ATS ground logic portion detects the train and transmits the ATS telegram 8A to the track circuit section 3T, the ATS telegram 8A is received by the carrier sensor, and the ATS onboard logic portion recognizes that a valid ATS telegram is received. Then, an error between the time when the train enters the track circuit section and the time when the boundary is detected and the calculated travel distance are subtracted from the block inner length of the ATS telegram 8A.

In addition, based on the deceleration performance of the train 5A, the block inner length of the ATS telegram 8, the block end aspect speed (R aspect), the average gradient and the pattern end type, a one-step braking pattern BP5 for the block end aspect speed is generated. Then, the generated braking pattern BP5 is compared against the current speed, and if necessary, optimal braking control is conducted. The ATS telegram 8A is transmitted to the track circuit section 3T every system cycle.

Then, a state shown in FIG. 5(C) is entered. In this state, the preceding train 5B has wholly entered the track circuit section 1T, and the aspect of the signal device 4-2 is changed from the R aspect to the Y aspect. Then, the ATS ground logic portion recognizes the aspect change as input information from another device. The ATS ground logic portion transmits the ATS telegram 8A created based on the latest aspect information (Y) of the signal device 4-2 to a transceiver associated with the track circuit section 3T within which the head of the train lies, and the transceiver MSK-modulates the ATS telegram 8A received from the ATS ground logic portion and transmits the MSK-modulated ATS telegram to the track circuit section 3T.

The carrier sensor of the ATS onboard device of the train 5A receives the ATS telegram 8A, demodulates the same and transmits the demodulated ATS telegram to the ATS onboard logic portion. The ATS onboard logic portion checks the validity of the received ATS telegram 8A based on the serial number and CRC information. If the ATS telegram is determined to be valid, a one-step braking pattern BP6 for the block end aspect speed is generated based on the deceleration performance of the train 5A, the block inner length, the block end aspect speed (Y aspect), the average gradient and the pattern end type in the ATS telegram 8A. Then, the generated braking pattern BP6 is compared against the current speed, and if necessary, optimal braking control is conducted. In this case, since the aspect of the signal device 4-2 is changed from the R aspect to the Y aspect, the R aspect pattern is not applied, and thus, the train can increase its speed.

In conventional ATS systems, an onboard device performs train control based on a frequency variable signal from a ground unit. Therefore, an immediate emergency stop function which requires no acknowledgment by the motorman is provided for an absolute signal device only, and as for inter-station signal devices, acknowledgment by the motorman is still required. Furthermore, since the protective function of the ATS is disabled once the acknowledgment is performed, there is a problem that accidents caused by red signal violation due to the motorman forgetting to stop the train after performing acknowledgment cannot be eliminated entirely. However, in an automatic train stop system according to the invention, an ATS telegram (train control information telegram) is transmitted every system cycle to a track circuit section within which the head of a train lies and a nonboard device receives the ATS telegram constantly. Thus, accidents due to red signal violation can be eliminated entirely.

In addition, in an ATS-S system, the installation position of a ground unit which prompts an alarm indicating the presence of a stop signal device or the need for deceleration is determined so as to accommodate a train having the lowest braking performance of the trains in service in the track section. Therefore, there is a problem that, in the case where trains having different deceleration performances are in service in a same track section, the trains cannot be controlled separately in accordance with their performances. However, in the automatic trainstop system according to the invention, train control information is digitized, and therefore, more information can be passed to the train. Thus, the ATS on board device generates a one-step braking pattern for a block end aspect speed based on the deceleration performance of the train and a block inner length, a block end aspect speed, an average gradient and a pattern end type in the ATS telegram, constantly checks the generated pattern against the current speed and if necessary, performs optimal braking control. Thus, trains can be controlled in accordance with their performances.

Furthermore, in the case of point control information transmission, once information is received, the information cannot be updated until the next information point is reached. That is, there is a problem that, when a signal device ahead of a train provides a stop aspect and the train receives the information from a ground unit, even if the signal device changes the aspect, the information cannot be updated until the train receives new information from the next ground unit. However, in the automatic train stop system according to the invention, the ATS telegram is created using the latest information every system cycle, and the ATS telegram is transmitted every system cycle to a track circuit section within which the head of a train lies. Therefore, it is possible to immediately respond to an aspect change.

What is claimed is:

1. An automatic train stop system, in which a track circuit is divided into a plurality of track circuit sections, and a digitized train control information telegram is transmitted through the track circuit on carriers having different frequencies for adjacent track circuit sections, characterized in that a carrier sensor mounted on a train receives a frequency of a carrier in the track circuit and detects a track circuit boundary by detecting a change of the frequency, whereby an onboard system grasps the position thereof, wherein the onboard system having received the digitized train control information telegram performs, after the telegram information is validated, correction of a position with respect to the track circuit boundary using a train speed and a system response time.

2. The automatic train stop system according to claim 1 wherein the onboard system having received the digitized train control information telegram generates a one-step braking pattern for a block end aspect speed based on a pattern end type, a block inner length or track circuit length, a block end aspect speed, an average gradient in the telegram information, and constantly checks the speed on the train.

3. The automatic train stop system according to any one of claims 1 and 2, wherein in the case of an insulating track circuit section, the digitized train control information telegram is transmitted to the track circuit section constantly or when the head of the train lies within the track circuit section and a route is set, and in the case of a non-insulating track circuit section, the digitized train control information telegram is transmitted to the track circuit section when the head of the train lies within the track circuit section.

4. The automatic train stop system according to any one of claims 1 and 2, wherein a digitized train detection telegram is transmitted to the track circuit constantly.

5. An automatic train stop system, in which a track circuit is divided into a plurality of track circuit sections, and a digitized train control information telegram is transmitted through the track circuit on carriers having different frequencies for adjacent track circuit sections, characterized in that a carrier sensor mounted on a train receives a frequency of a carrier in the track circuit and detects a track circuit boundary by detecting a change of the frequency, whereby an onboard system grasps the position thereof, wherein the onboard system having received the digitized train control information telegram generates a one-step braking pattern for a block end aspect speed based on a pattern end type, a block inner length or track circuit length, a block end aspect speed, an average gradient in the telegram information, and constantly checks the speed on the train.

6. The automatic train stop system according to claim 5, wherein in the case of an insulating track circuit section, the digitized train control information telegram is transmitted to the track circuit section constantly or when the head of the train lies within the track circuit section and a route is set, and in the case of a non-insulating track circuit section, the digitized train control information telegram is transmitted to the track circuit section when the head of the train lies within the track circuit section.

7. The automatic train stop system according to any one of claim 5 and claim 6, wherein a digitized train detection telegram is transmitted to the track circuit constantly.

8. The automatic train stop system, in which a track circuit is divided into a plurality of track circuit sections, and a digitized train control information telegram is transmitted through the track circuit on carriers having different frequencies for adjacent track circuit sections, characterized in that a carrier sensor mounted on a train receives a frequency of a carrier in the track circuit and detects a track circuit boundary by detecting a change of the frequency, whereby an onboard system grasps the position thereof, wherein in the case of an insulating track circuit section, the digitized train control information telegram is transmitted to the track circuit section constantly or when the head of the train lies within the track circuit section and a route is set, and in the case of a non-insulating track circuit section, the digitized train control information telegram is transmitted to the track circuit section when the head of the train lies within the track circuit section.

9. The automatic train stop system according to claim 8, wherein a digitized train detection telegram is transmitted to the track circuit constantly.

10. The automatic train stop system according to claim 3, wherein a digitized train detection telegram is transmitted to the track circuit constantly.

* * * * *